July 26, 1955  C. S. SCHROEDER  2,714,040
DEMOUNTABLE WHEELS
Filed Oct. 22, 1951  3 Sheets-Sheet 1

INVENTOR.
CHARLES S. SCHROEDER
BY
*A. H. Golden*
ATTORNEY

July 26, 1955 C. S. SCHROEDER 2,714,040
DEMOUNTABLE WHEELS
Filed Oct. 22, 1951 3 Sheets-Sheet 2

INVENTOR.
CHARLES S. SCHROEDER
BY
ATTORNEY

July 26, 1955

C. S. SCHROEDER 2,714,040

DEMOUNTABLE WHEELS

Filed Oct. 22, 1951

INVENTOR.
CHARLES S. SCHROEDER
BY
*J. H. Golden*
ATTORNEY

United States Patent Office 2,714,040
Patented July 26, 1955

2,714,040

DEMOUNTABLE WHEELS

Charles S. Schroeder, Philadelphia, Pa., assignor to The Yale & Towne Manufacturing Company, Stamford, Conn., a corporation of Connecticut Application October 22, 1951, Serial No. 252,540

5 Claims. (Cl. 301—13)

This invention relates to load carrying wheels of the class having dual tires. It is important that wheels of this type be so constructed that the mounting and demounting of the inner tire be accomplished quickly, and it is to this end that my invention is directed.

As one feature of my novel demountable wheel, I mount an annular rim inner tire carrying part of the wheel directly upon the hub through seating means that may be readily disengaged as by a bayonet joint. This is accomplished in my construction by seating the annular rim part upon the hub through a plurality of seating surfaces that are spaced in a direction circumferentially of the hub, these surfaces being presented in substantially a radial direction and extending a considerable distance axially of the hub. The seating surfaces therefore have the requisite bearing capacity to accept the radial and tilting forces that may result from a load on the wheel and, because of the discontinuous arrangement of these surfaces, the binding action that would resist demounting of the annular part is kept at a minimum. Further, the seating surfaces are tapered or inclined to facilitate further the demounting of the annular part, although this inclination is small and does not materially affect the radial load bearing capacity of the wheel.

As another feature of the invention, I so construct the annular rim part relatively to the hub that while engaging the hub very tightly over a large bearing area when assembled, it will freely pass the hub in an axial direction during the mounting and demounting procedure, as in the nature of a bayonet joint. This feature is of particular value when the annular part is utilized as the inner of two annular parts that form with the hub a dual wheel arrangement, and permits the inner part to be easily removed over the seating means.

I have thus outlined rather broadly the more important features of my invention in order that the detailed description thereof that follows may be better understood and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention in order to prevent the appropriation of my invention by those skilled in the art.

Referring now to the drawing.

Figure 1:
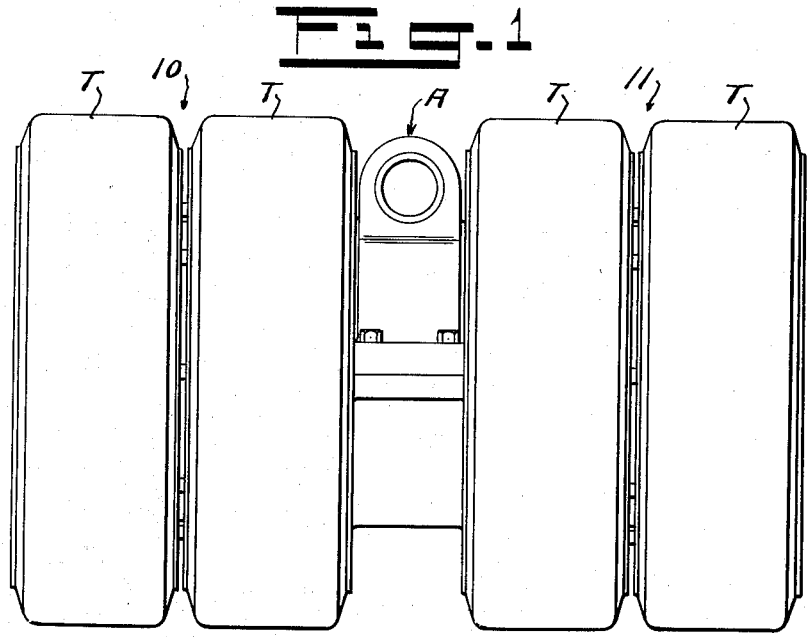
Fig. 1 is a front view showing an arrangement in which my novel demountable wheel construction is utilized to provide dual wheels at opposite sides of a drive unit for an industrial truck.

In the drawing, my novel demountable wheel construction is shown embodied in a dual wheel 10, and also in a dual wheel 11 that is utilized together with the wheel 10 for carrying a drive unit A for an industrial truck. While specific details of the drive unit A are not important to a description of my invention, it will be noted here that the drive unit A is designed for extremely heavy duty and has an axle B that projects at opposite sides of the unit for mounting the dual wheels 10 and 11.

Because the dual wheels 10, 11, are of identical construction, a description of the wheel 10 will suffice for both. The dual wheel 10 has three principal parts, i. e., a hub 12 that is permanently mounted upon the axle B by suitable means, and duplicate outer and inner annular parts 13 and 14 that encircle the hub in side-by-side relationship and that each carry a resilient tire T. Upon the periphery of the hub 12 is formed a series of lugs or lands 15 that extend in a direction parallel to the axis of the hub. These lugs 15 are separated by slots 16 that are slightly wider than the lugs for reasons that will appear. Each of the annular parts 13, 14, has a series of lugs or lands 17 that are integrally formed upon the inner periphery of each of the annular parts and so spaced as to seat upon the lugs 15 on the hub 12. The lugs 17 are separated by slots 18 having a width slightly greater than the width of the lugs 17.

Figure 5:
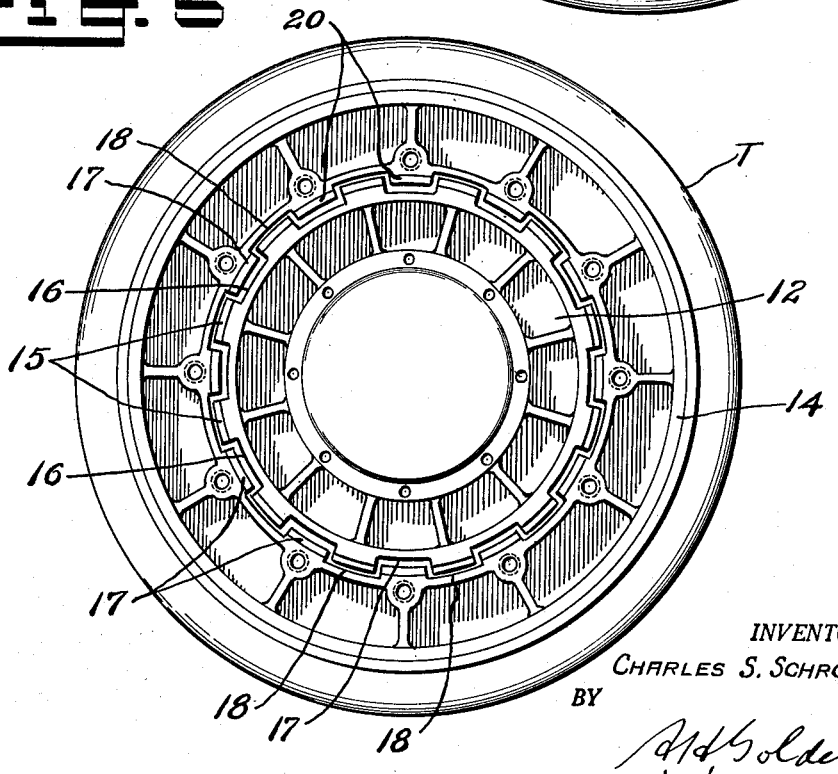
Fig. 5 is a view showing the annular part in position to move freely in an axial direction upon the hub in mounting or demounting the wheel.
Figure 6:
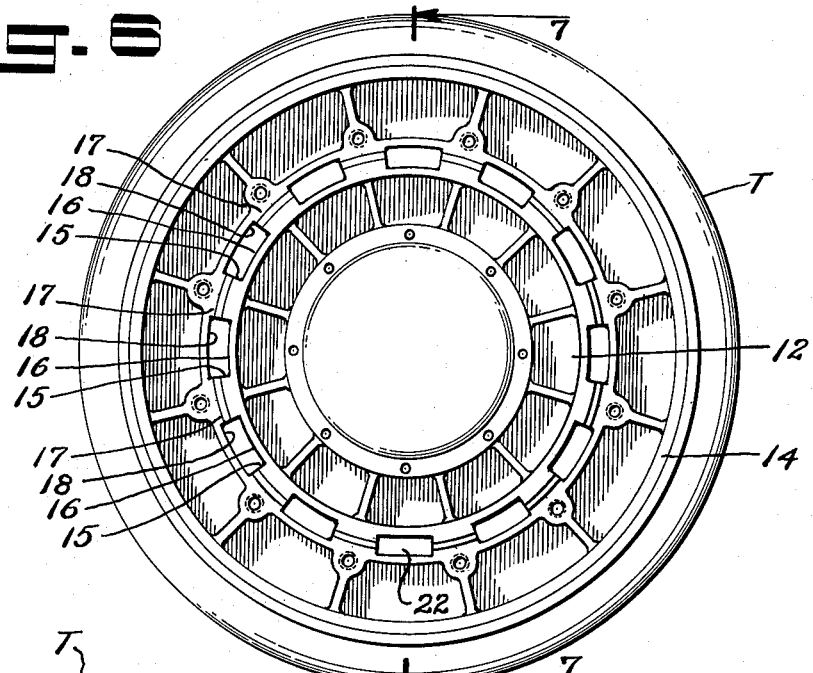
Fig. 6 is a view similar to Fig. 5, but showing the annular part turned into full engagement with the hub so as to be mounted thereon.

Therefore, when either of the annular parts 13 or 14 is in one predetermined angular position upon the hub 12, the lugs 17 upon that annular part will be located opposite the slots 16 of the hub to pass freely over the hub in an axial direction, as will be clearly seen in Fig. 5. This construction permits the inner annular part 14 to be passed over the hub 12 during the mounting procedure and then turned through a small angle so as to bring the lugs 17 into alignment with the lug 15.

Figure 7:
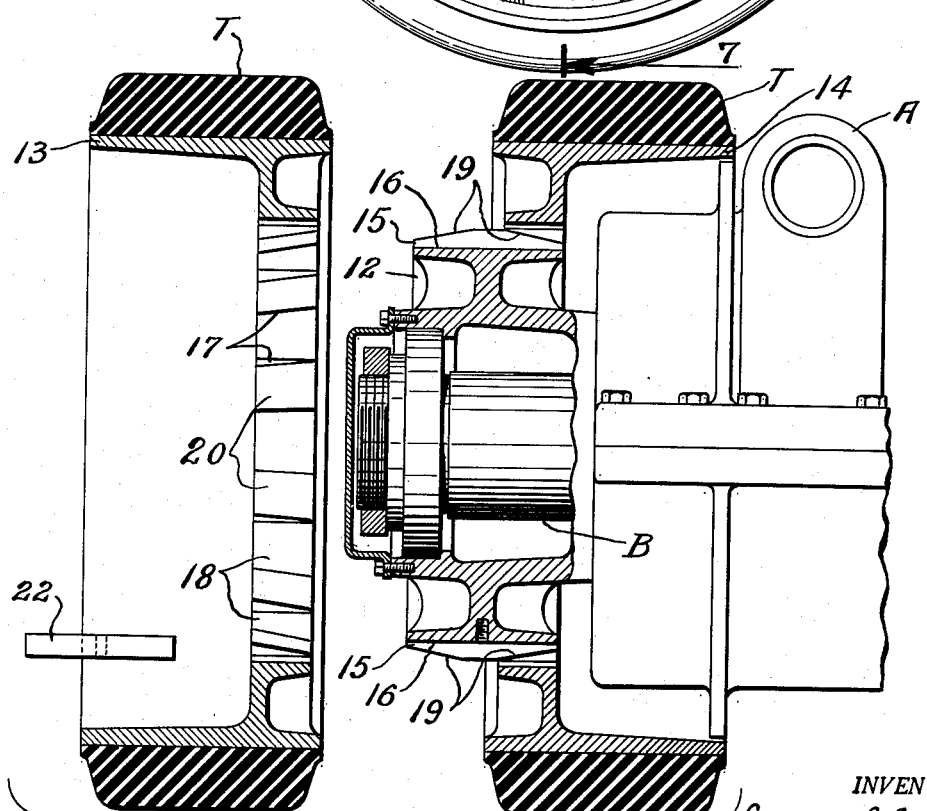
Fig. 7 is a sectional view taken on the line 7—7 of Fig. 6, showing certain parts in exploded relationship.

Lugs 15 have seating surfaces 19 so inclined that the lugs 17 will be seated upon the lugs 15 through an axial movement of the annular part relatively to the hub once the lugs 15, 17, are aligned. Thus, as is best seen in Fig. 7, the lugs 15 upon the hub 12 are highest at their central portions and taper toward the axis of the hub at opposite ends of the lugs. The seating surfaces on the lugs 17 on the annular parts 13, 14, are, of course, inclined so as to be complementary to the seating surfaces 19 as indicated by the numeral 20. The inclination of the seating surfaces 19, 20, is sufficient to permit the annular parts 13 and 14 to be seated and unseated in the manner described, but this inclination is nevertheless small so that the seating surfaces are presented in a direction that is predominantly radial, and therefore afford ample bearing area for carrying the very heavy loads to which the wheel may be subjected.

Figure 2:
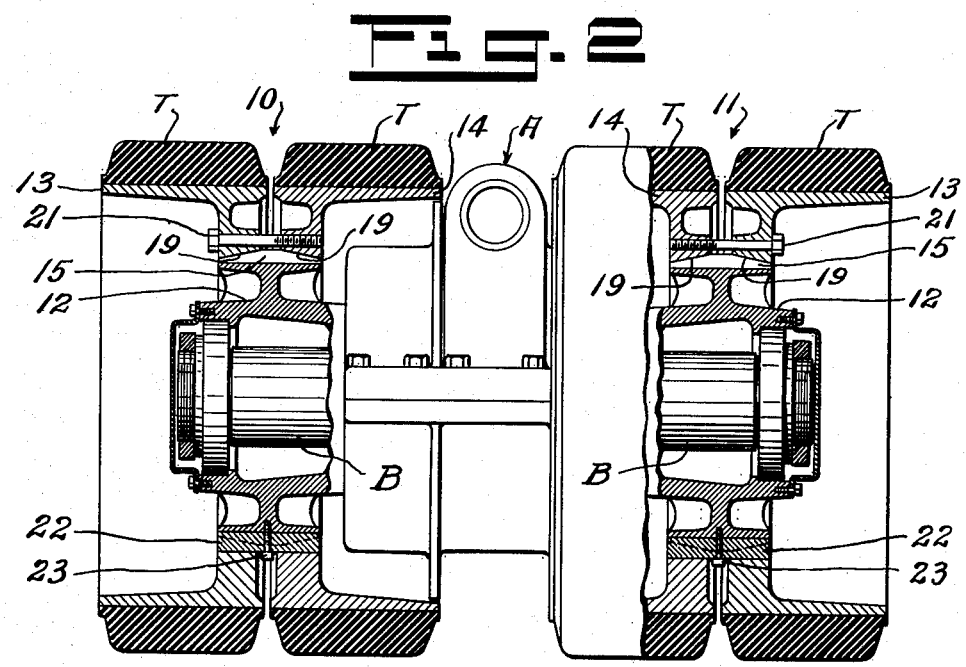
Fig. 2 is a view similar to Fig. 1, but partly in section to show the construction of the wheels.
Figure 3:
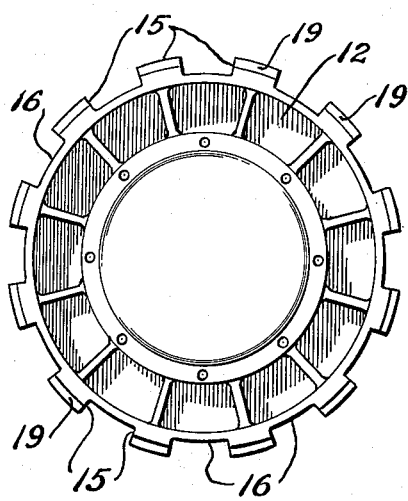
Fig. 3 is an end view showing the hub part of my novel wheel construction.
Figure 4:
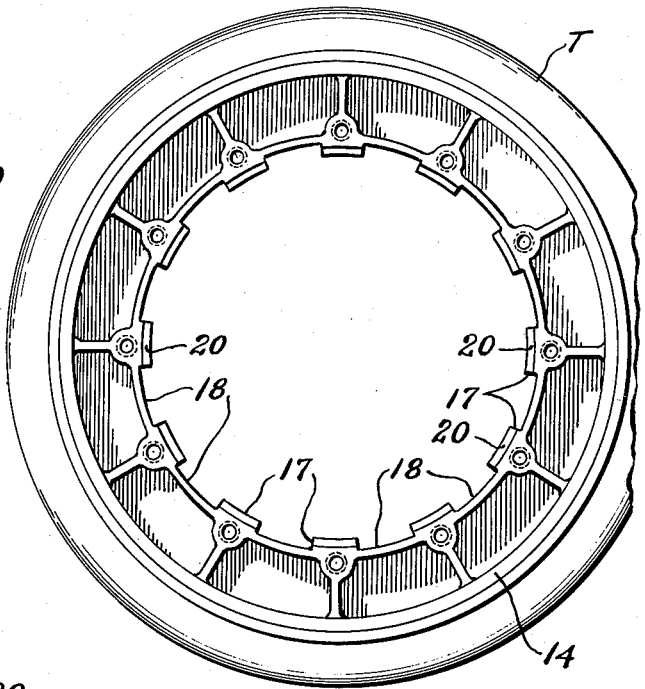
Fig. 4 is a view showing the annular part of the wheel.

Once assembled upon the hub 12 with the lugs 15, 17, engaged, the annular parts 13, 14, are pressed toward each other by suitable means that I have shown in the drawings as bolts 21 engaged through the annular parts. Thus, the annular parts 13, 14, are securely wedged upon the hub 12 so as to form an integral dual wheel. In order to eliminate any possibility of the annular parts creeping in a circumferential direction upon the hub 12, I may provide a key 22 that is fitted into one of the slots 16 in the hub 12 and extends also into the opposite slot 18 in each of the annular parts 13, 14. The key 22 may be easily slipped into place when the annular parts are in assembled position upon the hub, and is held in position by a bolt 23 passing through the key and into the hub as is shown in Fig. 2.

From the foregoing description it is believed to be apparent that the inner annular part 14 will be assembled upon the hub 12 by passing it axially over the hub with the lugs 17 on the annular part passing freely through the slots 16 in the hub, and then turning the annular part 14 slightly so as to bring the lugs into registry, whereupon a slight axially outward movement will engage the seating surfaces 20 with the seating surfaces 19. The outer annular part 13 will then be applied to the hub 12 so that its seating surfaces 20 will engage the outer seating surfaces 19 of the hub, and when the key 22 and the bolts 23 and 21 are applied to the assembly, the wheel will then be complete. Of course, the tire carrying annular parts 13, 14, are interchangeable because of their identical construction, and they actually constitute the same part from the standpoint of manufacture and the stocking of parts.

I now claim:

1. In a wheel of the class described, a hub having a peripheral ridge with surfaces inclined at each side toward the axis of said hub, an inner annular part for encircling said hub, spaced lugs on the inner periphery of said annular part, slots in the ridge of said hub for the passage of said lugs to allow said inner annular part to pass said hub in an axial direction, said lugs aligning with the inclined surfaces at the inner side of said ridge through rotation of said inner annular part after passing said hub, an outer annular part formed at its inner periphery to duplicate said inner annular part for the seating thereof upon the inclined surfaces at the outer side of said ridge, and means extending between said inner and outer annular parts radially outside said peripheral ridge of said hub for pulling said inner and outer annular parts toward each other into wedged relation with said ridge surfaces to form an integral wheel.

2. In a wheel of the class described, a hub having a peripheral ridge with surfaces inclined at each side toward the axis of said hub, an inner annular part for encircling said hub, spaced lugs on the inner periphery of said annular part, slots in the ridge of said hub for the passage of said lugs to allow said inner annular part to pass said hub in an axial direction, said lugs aligning with the inclined surfaces at the inner side of said ridge through rotation of said inner annular part after passing said hub, an outer annular part formed at its inner periphery to duplicate said inner annular part for the seating thereof upon the inclined sufraces at the outer side of said ridge, and means spaced from contact with said hub extending between said outer and inner annular parts for pulling said annular parts toward each other whereby to wedge said parts relatively to said ridge surfaces to form an integral wheel.

3. In a wheel of the class described, a hub having a peripheral ridge with surfaces inclined at each side toward the axis of said hub, an inner annular part for encircling said hub, spaced lugs on the inner periphery of said annular part, slots in the ridge of said hub for the passage of said lugs to allow said inner annular part to pass said hub in an axial direction, said lugs aligning with the inclined surfaces at the inner side of said ridge through rotation of said inner annular part after passing said hub, an outer annular part formed at its inner periphery to duplicate said inner annular part for the seating thereof upon the inclined surfaces at the outer side of said ridge, means radially outside the peripheral ridge of said hub for pulling said inner and outer annular parts toward each other into wedged relation with said ridge surfaces to form an integral wheel, and a key for engaging between said hub and said inner and outer annular parts to hold said parts against rotation relatively to the hub.

4. In a wheel of the class described, a hub having a peripheral ridge with surfaces inclined at each side toward the axis of said hub, an inner annular part for encircling said hub, spaced lugs on the inner periphery of said annular part, slots in the ridge of said hub for the passage of said lugs to allow said inner annular part to pass said hub in an axial direction, said lugs aligning with the inclined surfaces at the inner side of said ridge through rotation of said inner annular part after passing said hub, an outer annular part formed at its inner periphery to duplicate said inner annular part for the seating thereof upon the inclined surfaces at the outer side of said ridge, means radially outside the peripheral ridge of said hub for pulling said inner and outer annular parts toward each other on said inclined surfaces at opposed sides of said ridge, and said inclined surfaces shaped to hold said annular parts in spaced relation to one another whereby to effect wedging of said parts with the hub when the parts are pulled toward each other by said means.

5. In a wheel of the class described, a hub having a peripheral ridge with surfaces inclined at each side toward the axis of said hub, an inner annular part for encircling said hub, spaced lugs on the inner periphery of said annular part, slots in the ridge of said hub for the passage of said lugs to allow said inner annular part to pass said hub in an axial direction, said lugs aligning with the inclined surfaces at the inner side of said ridge through rotation of said inner annular part after passing said hub, said inclined surfaces intermediate the slots extending a substantial distance along the length of the hub whereby to coact with said lugs for aligning and centering the inner annular part relatively to the axis of the hub, an outer annular part having a portion for seating upon the inclined surfaces at the outer side of said ridge whereby to align the outer annular part relatively to the axis of the hub, and means for pulling said inner and outer annular parts toward each other into wedged relation with said ridge surfaces to form an integral wheel.

References Cited in the file of this patent

UNITED STATES PATENTS

| | | |
|---|---|---|
| 278,726 | Morgan | June 5, 1883 |
| 1,230,616 | Stevenson | June 19, 1917 |
| 1,304,794 | Morgan | May 27, 1919 |
| 1,669,498 | Swain | May 15, 1928 |
| 2,154,932 | Gannett | Apr. 18, 1939 |